Feb. 26, 1963  R. H. PARK  3,078,507
METHOD AND APPARATUS FOR MAKING PLASTIC ARTICLES
Filed Nov. 19, 1958  3 Sheets-Sheet 1
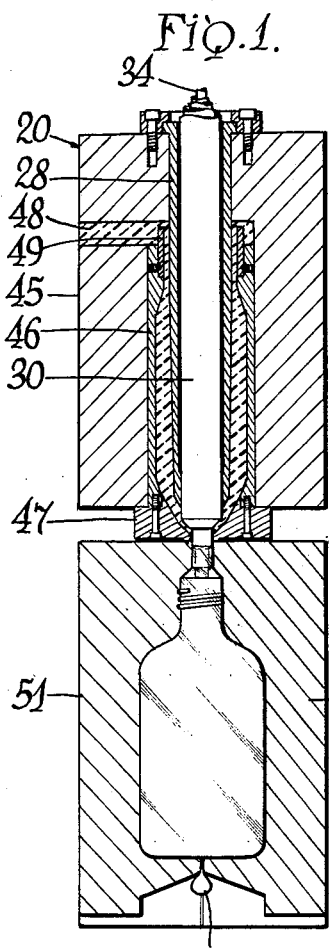
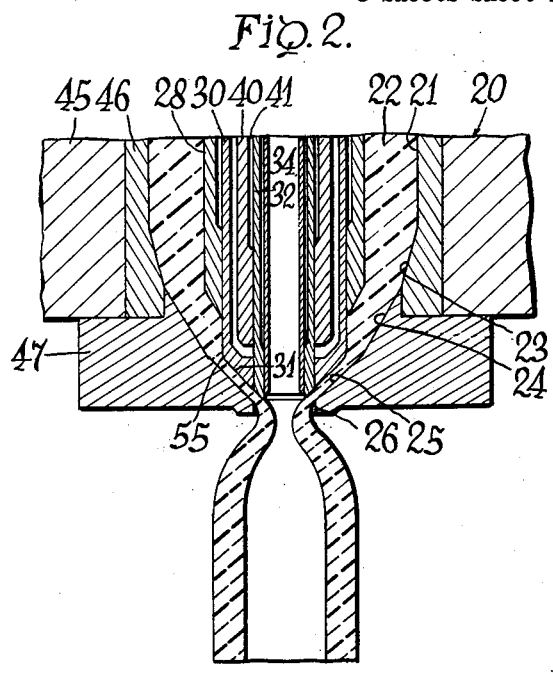
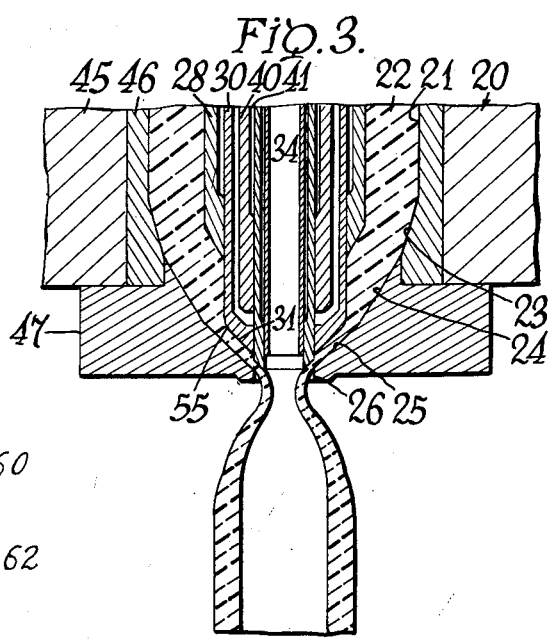
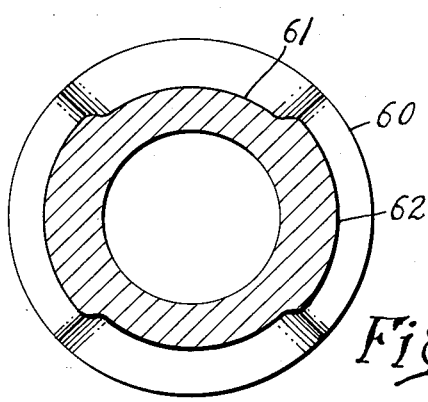
INVENTOR.
Robert H. Park,
BY
Beau, Brooks, Buckley & Beau
ATTORNEYS.

Feb. 26, 1963 R. H. PARK 3,078,507
METHOD AND APPARATUS FOR MAKING PLASTIC ARTICLES
Filed Nov. 19, 1958 3 Sheets-Sheet 2
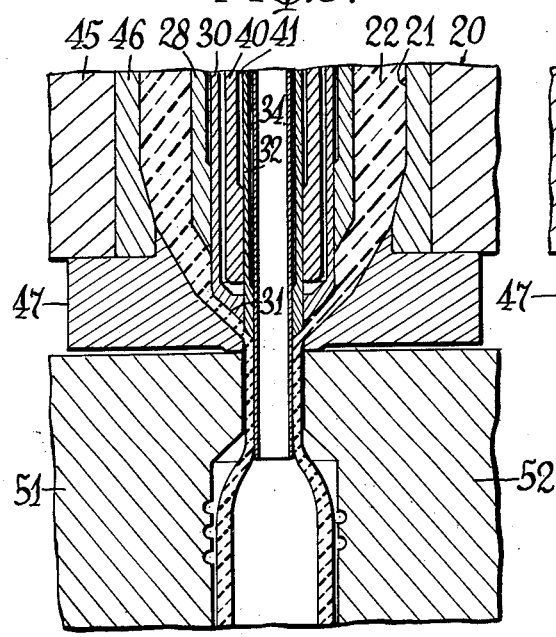
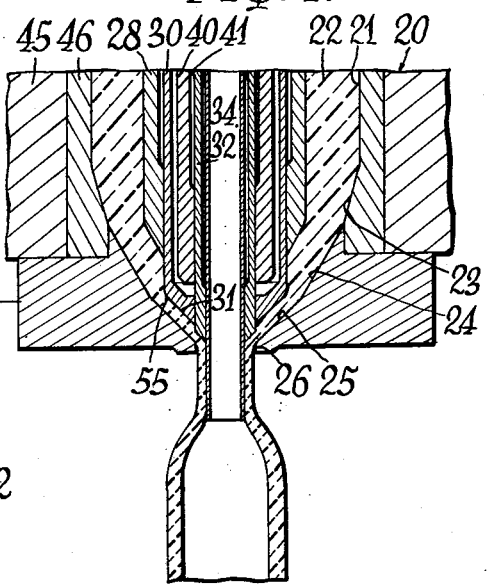
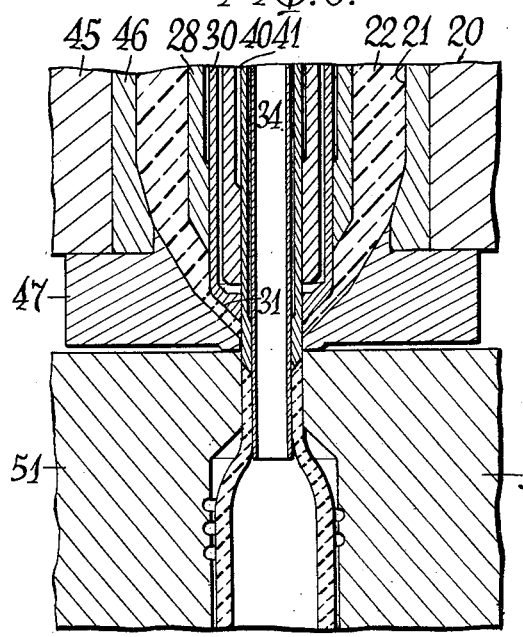
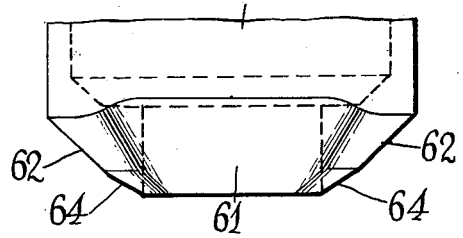
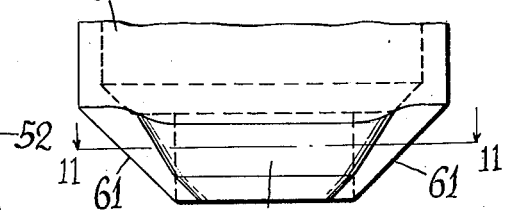
INVENTOR.
Robert H. Park,
BY
Bean, Brooks, Buckley & Bean.
ATTORNEYS Feb. 26, 1963 R. H. PARK 3,078,507
METHOD AND APPARATUS FOR MAKING PLASTIC ARTICLES
Filed Nov. 19, 1958 3 Sheets-Sheet 3
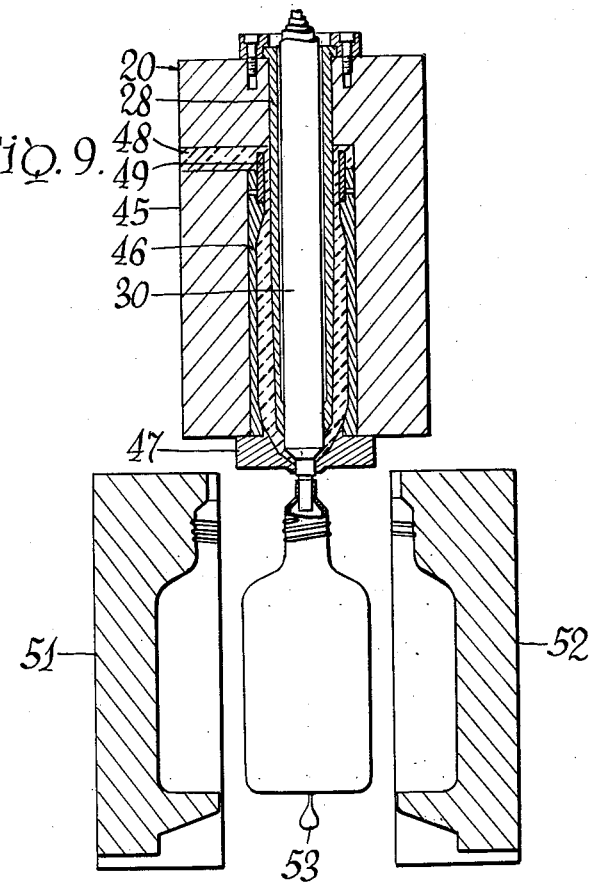
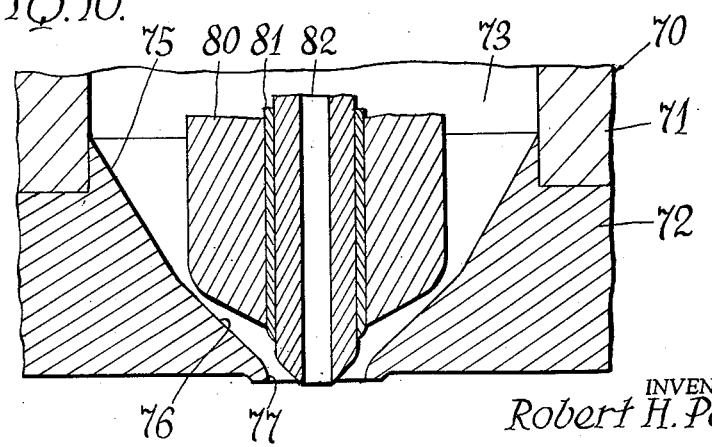
INVENTOR.
Robert H. Park,
BY
Bean, Brooks, Buckley + Bean
ATTORNEYS.

United States Patent Office 3,078,507
Patented Feb. 26, 1963

3,078,507
METHOD AND APPARATUS FOR MAKING
PLASTIC ARTICLES
Robert H. Park, Dennis, Mass., assignor to Brockway
Glass Company, Inc., Brockway, Pa.
Filed Nov. 19, 1958, Ser. No. 775,055
11 Claims. (Cl. 18—5)

This invention relates to methods of and apparatus for producing hollow plastic articles such as containers by extruding a tubular blank and subsequently blowing the same outwardly into conformity with a mold.

This application in some respects relates to improvements in the method and apparatus disclosed and claimed in my pending patent application, Serial No. 443,272, filed July 14, 1954, now Patent No. 3,008,191. According to the method and apparatus of the aforesaid copending application a tubular blank is extruded about an extrusion mandrel which serves as a blow tube for subsequently blowing the blank outwardly into conformity with a mold and the actual extrusion passage which chiefly determines the diameter and wall thickness of the tubular extrusion comprises a hollow cylindrical extrusion passage, this passage being the space defined by the final cylindrical bore at the bottom of the extrusion casing and the external periphery of the blow tube.

In the primary form of the apparatus and method of the aforesaid application the extrusion passage is of approximately the same outside diameter as the neck mold portion of the article mold so that the neck mold portion forms substantially a continuation of the hollow cylindrical extrusion orifice and the extrusion, before blowing, is of substantially the same size as the finished neck of the bottle.

The apparatus of the aforesaid copending application includes as a novel element thereof a so-called degating sleeve which fits closely within and passes downwardly through the hollow cylindrical extrusion passage to sever an extruded blank from the parent body of plastic material and push the severed extrusion out of the extrusion passageway. Prior to passage through the cylindrical extrusion passageway, the plastic material passes about this degating sleeve in annular form so that the extrusion is to some extent reduced in diameter as it enters the extrusion passage proper.

The phenomenon of elastic memory and its effect on a tubular extrusion is discussed to some extent in the aforesaid copending application and in any event certain of the physical results of this phenomenon are recognized in the plastic extrusion art. While the causes of certain difficulties may not be fully known, it appears that the shape assumed by the material prior to entering the actual extrusion passage has certain effects on the shape of the extrusion which issues from the extrusion passage, even though the final extrusion passage be of substantial length.

For one thing, it is recognized that such an extrusion swells substantially in diameter as it progresses downwardly away from the point of issuance from the extrusion passage. This condition introduces certain problems in molding the ultimate extrusion, such problems being generally of greater or less effect depending on the relative diameters of the extrusion, the neck portion of an article, and the desired body portion of the article.

I have found that for certain purposes the desired tubular extrusion can best be formed by extrusion through an annular passage which converges toward the axis of the tubular extrusion, while for other purposes extrusion can better be effected through a straight hollow cylindrical extrusion passageway. Furthermore, it appears that one or the other of these extrusion methods may be better for extruding certain types of hollow plastic articles.

Still further, I have found that a highly effective converging extrusion passage is one wherein the inner converging extrusion surface extends further inwardly toward the axis of the extrusion passage than the outer extrusion surface. In pursuing this teaching, I provide a degating sleeve of the general type referred to above whose bottom end is beveled, tapered or otherwise contoured to form a radially inward continuation of the converging internal extrusion surface.

Still further I have found that it is desirable to vary the effective thickness of the foregoing converging extrusion orifice by providing an axially movable sleeve member disposed circumferentially about the degating sleeve. The lower end of this axially movable sleeve is tapered, rounded or otherwise contoured to converge generally toward the aforesaid axis. The axial movement of this sleeve (hereinafter referred to for convenience as a control sleeve) may be cyclic, either partly in synchronism with or independently of the cyclic movement of the degating sleeve, or may merely constitute an axial adjustment adapted to provide a plastic flow passage of predetermined characteristics.

I have further found that the innermost of the telescoping members, identified as the blow tube in the above identified prior application and so designated later herein, may be advantageously utilized to cyclically regulate plastic flow by positioning it so that it bears against the inner surface of the forming tubular extrusion and cyclically moving it axially. This motion also may be synchronous or independent with respect to the other sleeve motions. For the foregoing purposes the blow tube may advantageously be convergingly contoured in the same general manner as the other sleeves.

I have further found that, with certain hollow articles such as plastic bottles or containers, extrusion of a tubular blank can be most effectively carried on by producing a tubular extrusion of substantially less diameter than the specified or necessary diameter of the neck of the bottle or similar article. This latter desirability is in part by reason of the swelling tendencies of the tubular extrusion which is referred to briefly above, since such swelling tendency, among other things, aggravates the tendency of the extrusion to be pinched externally by the neck portion of the mold, and even in many instances by the body portion of the mold, when the usual mold surfaces are closed upon the extrusion.

Accordingly, one phase of the present invention involves the production of containers having so-called auxiliary or false finish or neck portions of less diameter than and in addition to the actual desired neck portion. Such auxiliary or false finish portions are then severed from the article after extrusion and molding. However, the presence of the so-called auxiliary or false finish is utilized in certain handling and positioning operations prior to severance thereof from the finished article. In instances where the neck of the finished article is designedly small relative to the proportions of the body of the bottle the so-called false finish of the present method and apparatus may comprise the actual neck finish of the bottle.

Previous extrusion methods and apparatus have, in general, been limited to the production of extrusions having the same general diameter and a constant or only gradually varying wall thickness. These methods and apparatuses have accordingly dictated and resulted in the production of bottles wherein the wall thickness of the neck portion is arbitrarily dependent upon the wall thickness of the body of the bottle, or vice versa. Speaking generally, and particularly when bottles having a relatively small neck are to be made, the resultant neck wall will usually be much thicker than the wall of the body of the bottle and much thicker than optimum design would dictate. The present invention provides a method and apparatus whereby the wall thickness of the extrusion may be adjusetd according to any desired pattern during the development thereof, so that the wall thickness of the neck is not dependent upon the amount of material necessary to produce the desired body wall thickness and diameter.

An important advantage of the apparatus and method of the present invention concerns the production of non-circular bottles or bottles wherein the bodies are oval or flat or of other non-circular cross-section. In such instances the so-called control sleeve of the present apparatus is formed with a non-circular bevel to form an extrusion having nonuniform distribution of plastic about the wall of the extrusion, in accordance with any desired pattern of distribution. Since the neck and finish portions of the extrusion may be formed with the degating sleeve moved downwardly to serve as the inner extrusion member, these portions may be fully circular and uniform about their circumference despite the circularly nonuniform distribution in the portion of the extrusion which forms the body of the bottle.

Furthermore, any desired variation of distribution and wall thickness along the length of the extrusion may be effected, as in making generally spherical bottle bodies, for instance, by suitable longitudinal manipulation of one or more of the inner extrusion members, such as the aforesaid control sleeve, degating sleeve, and blow tube.

In a preferred mode of practicing the present invention the plastic material is forced through the extrusion means by a positive displacement pump which will most conveniently be of the reciprocating type. The motion of this pump is synchronized with the cyclic motions of the control and degating sleeves and blow tube and the pumping rate may follow a variable pattern in the cycle in accordance with variable extrusion requirements and to produce optimum extrusion results.

The accompanying drawings and the following description set forth certain embodiments of the apparatus of the present invention by way of example but it is to be understood that the principles of the present invention are not limited to the precise apparatus thus set forth or to the detailed methods likewise described in the specification by way of example, the scope of the invention being as defined in the appended claims.

In the drawings:

FIG. 1 is a general vertical cross-sectional view through one form of the extrusion and mold apparatus of the present invention illustrating a final step in a cycle of the extrusion and blowing operation;

FIG. 2 is a view similar to FIG. 1 but on a considerably enlarged scale and showing fragmentarily only the actual extrusion portion of the apparatus in a first phase of the extrusion, namely the phase wherein the body portion of a conatiner is being extruded;

FIG. 3 is a view similar to FIG. 2 but showing a second phase in an extrusion process wherein the neck portion of a container is being extruded;

FIG. 4 is a view similar to FIGS. 2 and 3 showing a third phase of the extrusion operation wherein, in the present instance, a false reduced neck or finish portion is being extruded;

FIG. 5 is a view similar to FIG. 4 but with the separable mold parts closed about the extrusion;

FIG. 6 is a view similar to FIG. 5 but with the extrusion severed from the parent body of plastic material by operation of the degating sleeve;

FIG. 7 is a detailed fragmentary elevational view, on an enlarged scale, of the lower portion of a modified form of control sleeve for extruding non-circular parisons;

FIG. 8 is a view similar to FIG. 7 but viewed at right angles thereto;

FIG. 9 is a view similar to FIG. 1 but showing the mold members open following a final blowing step, the bottle being supported entirely by frictional engagement of the blow tube in the upper end thereof, whereby the bottle is oriented in a given position;

FIG. 10 is a view generally similar to FIGS. 2 through 6 but on a larger scale and showing only the lower end portion of a modified form of the extrusion means; and FIG. 11 is a cross-sectional view taken approximately on the line 11—11 of FIG. 8.

Like characters of reference denote like parts throughout the several figures of the drawings. The present invention is concerned primarily with the extrusion head and with the construction and operation of the extruding members thereof. Accordingly, only so much of the surrounding apparatus is illustrated as is proper for a full understanding of the present invention. The several tubular members illustrated in the drawings and described in the following specification have certain relative vertical movements in timed relation with respect to each other and such movements are described without reference to the means for producing the relative vertical movements. It will be understood by those skilled in this art that cam controlled rock arms or other known means may be employed for producing the required timed movements.

Referring particularly to FIGS. 1 through 6, the numeral 20 designates generally the extrusion head proper which is vertically bored as at 21 to form the external confines of an annular extrusion chamber designated 22, the bore 21 being, in the present instance, provided at its lower end with a series of beveled surfaces 23, 24 and 25 which reduce the diameter of the chamber progressively toward its lower end, terminating in a cylindrical orifice 26.

The internal wall of the annular extrusion chamber 22 is formed by a series of coaxial telescoping tubular members, the outermost, designated 28, being axially fixed with respect to the head 20 at its upper end and serving as a support or guide for the more internal tubular members.

Referring particularly to FIG. 2, an exterior control sleeve 30 slides axially within guide sleeve 28 and has an inwardly directed beveled lower end portion 31 which fits closely about a further telescoping control sleeve member 32 which shall be referred to herein as a degating sleeve since in the exemplary embodiment it serves as the plastic cut-off member. The innermost tube in FIGS. 2 through 6 is designated 34 and is referred to as a blow tube, although this tube functions as an inner extrusion member in certain phases of operation of the present apparatus. While the lower end of blow tube 34 is shown as square in FIGS. 1 through 6, it is to be understood that the tip of tube 34 may be beveled to facilitate employing the tube 34 as a further extrusion control member which may be used alternatively or supplementarily to one or both of the other sleeves.

It will be noted that degating sleeve 32 has disposed thereabout a sleeve member 40 which shields the degating sleeve against plastic which, in relatively small quantities, more or less inevitably oozes between control sleeve 30 and the degating sleeve 32 in normal operation. Sleeve member 40 also serves to scrape such plastic from the lower portion of degating sleeve 32 when the latter moves upwardly. A similar protective sleeve may be employed between the control sleeve 30 and support sleeve 28.

Having reference now to the more general view, FIG. 1, the extrusion head which has previously been generally designated by the numeral 20 comprises a shell or body member 45 having a sleeve 46 fixed therein and an end member 47 fixed to the outer end of sleeve 46. The removability of the sleeve 46 from shell 45 and the removability of end member 47 from sleeve 46 facilitates manufacture and the substitution of sleeves and end members of various internal dimensions for various work and also facilitates cleaning the plastic flow passages as the necessity arises.

A lateral passage 48 in body member 45 leads to the upper end of sleeve 46 and plastic material is fed thereto from conventional plasticizing apparatus and, more immediately, from the cyclic pumping apparatus described generally in the preamble hereto. A separate upwardly projecting tubular member 49 provides a weir-type orifice which restricts and directs plastic flow into the interior of sleeve 46 to control distribution of plastic material therein.

A mold for receiving and forming the extruded plastic material directly underlies the end member 47 of the extrusion head and the mold means comprises separable mold halves 51 and 52, the same being mounted for relative opening and closing movements in a well-known manner. As will be noted from FIG. 1, the present arrangement, by way of example, is such that the mold halves 51 and 52 close against the lower end of an extruded tube of plastic material and pinch the same as at 53 in FIG. 1 to form a closed bottom.

Referring now to the operation of the apparatus of FIGS. 1 through 6, as illustrated in detail in step by step manner in FIGS. 2 through 6, it will be noted that in FIG. 2 the beveled ends of the control sleeve 30 and the degating sleeve 32 are flush so that the frusto-conical surface formed thereby extends continuously inwardly, in a radial direction, substantially beyond the walls of orifice 26.

I have found that the surface appearance of the extruded and blown article is affected to a marked degree by the relative positions of the ends of the control and degating sleeves during the extrusion steps.

Experiments and experience demonstrate that, if the end of the degating sleeve 32 is slightly withdrawn with respect to the end of the control sleeve 30, smears are produced on the inside of the resultant bottle, and if the end of the degating sleeve is withdrawn to a greater degree the inside of the extrusion and the resulting bottle becomes corrugated. These conditions are corrected or eliminated when the end of the degating sleeve 32 projects slightly beyond the end of the control sleeve. This procedure will produce a satin finish on the exterior of the bottle which is usually objectionable, unless the corner at the juncture of the bevel and the outside diameter of the degating sleeve 32 is rounded slightly. Operation was found to be further improved by rounding off the juncture of the beveled end of control sleeve 30 with the periphery thereof slightly, as shown at 55 in FIG. 2, for instance.

A typical representative series of forming steps in the case of a bottle of mean or average size and proportions is illustrated in step-by-step fashion in FIGS. 2 through 6. In FIG. 2 the portion of the extrusion which forms the body of the bottles of the mold of FIG. 1 has just been completed. At this point the degating sleeve may be lowered slightly as indicated in FIG. 3, wherein the actual neck portion of the bottle of FIG. 1 has just been extruded. In FIG. 4, following the extrusion of the true neck portion of the bottle, blow tube 34 has been or is being lowered and extrusion of the so-called false finish about the blow tube is being effected. It will be noted that degating sleeve 32 is slightly lower in FIG. 4 than in FIG. 3 in order to reduce the wall thickness of the false finish portion of the extrusion as compared with the true neck portion thereof.

FIG. 5 shows the completion of the extrusion of the false finish portion of the bottle and the mold parts 51 and 52 have closed upon the extrusion. In FIG. 6 the parts are in the same relative position as in FIG. 5 excepting that degating sleeve 32 has lowered to separate the extrusion from the parent body of plastic material, which lowering movement presses the false finish portion of the extended material into the falsh finish mold portion. Blowing air is then introduced and both the body portion and the true neck portion of the bottle are blown into conformity with the cavity in the mold 51, 52, as shown in FIG. 1.

Upon subsequent opening of the mold parts 51 and 52 the formed bottle remains suspended by frictional engagement of blow tube 34 in the interior of the false finish portion of the bottle as shown in FIG. 9, or the true finish as the case may be, and the finished bottle may be engaged by any desired handling or transfer means, following which the blow tube may be withdrawn from the bottle. Such withdrawal frees the bottle from the present apparatus, either in engagement with take off or transfer means or to fall freely therefrom. The secure suspension of the finished bottles on the blow tube insures that the bottles will always be oriented in the same position and, when mechanical take-off and transfer means are employed the bottle will always be oriented with respect to the take-off and transfer means.

Reference will now be had to FIGS. 7 and 8 which show a control sleeve 60 which is the same in all respects as the control sleeve 30 of the primary embodiment excepting as to the contour and conformation of the beveled lower end thereof. In the case of the control sleeve 30 the bevel of the lower end portion 31 is a surface of revolution, whereas in the case of the control sleeve 60 of FIGS. 7 and 8 the beveled lower end is irregular and non-circular in order to form an extrusion having thicker walls at certain points thereabout. In the present instance the bevel is so arranged that thicker walls will be formed at diametrically opposed points of the extrusion than at the diametrically opposed points at right angles thereto.

Referring specifically to FIGS. 7 and 8, diametrically oppoiste bevel portions 61 are cut back farther than bevel portions 62 which are likewise diametrically opposed but at right angles to the bevel portions 61. The bevel portions 61 and 62 may be blended into each other by means of curving portions in various ways.

It is to be understood that the control sleeve 60 cooperates with the beveled surface 25 of the extrusion head 20 and that when the control sleeve 60 is in an extruding position with respect to the other parts, somewhat as indicated in FIG. 2, the wall thickness of the extrusion will be thicker at the bevel portions 61 than at the bevel portions 62. After the body of the extrusion has thus been developed, the control sleeve may be withdrawn or the degating sleeve 32 may be projected, or both, to extrude a circular portion of uniform wall thickness for forming the neck of a container, for instance.

It is to be understood that, by way of example, the internal configuration of the control sleeve 60 may be identical with the internal configuration of the control sleeve 30. In the illustrated instance the angles of the bevel portions 61 and 62 are identical and the lower bevel portions 62 are provided with additional flatter chamfers 64 whereby the bevel portions terminate radially inwardly in a common horizontal plane at the bore in the lower end of control sleeve 60, as illustrated in FIGS. 7 and 8.

Ordinarily it is preferable to provide a scalloped bevel portion only on the control sleeve. This is because as in oval or oblong or other non-circular bottles it is desirable to have non-uniform circumferential distribution of material for forming the body of a bottle and uniform distribution for forming the neck portion. However, in some cases it may be desirable to provide either coincidental or opposed scalloping of the bevel portions of the control and degating sleeves. The transition in the parison from non-circular to circular conformation and other similar transitions may be made abruptly or gradually by controlling the rate of relative movements of the control sleeve and/or the degating sleeve. An extrusion space which is of varying width about the annulus formed thereby may be attained by scalloping the ledge 25 instead of the control sleeve 60 or one of the other sleeve members.

It is to be understood that the term "complementary" as used in the claims with respect to the slope or bevel of the ends of the sleeves or tubes and the slope of the surface 25, for instance, of the ledge portion of the extrusion chamber, merely refers to the general direction of such slopes or bevels.

Reference will now be had to the embodiment illustrated in FIG. 10 which shows certain variations in the relative diameters of the several extrusion sleeve members and variations in the contours of their lower end portions. For convenience in understanding the reasons behind these variations, the construction itself will first be described, following which reference will be had to certain problems arising in plastic extrusion, some of which problems are peculiar to extrusion with multiple cyclically moving extrusion control members.

Referring to FIG. 10, an extrusion head is indicated generally by the numeral 70 and as in the preceding instance comprises a shell or body member 71 and a lower end member 72. The shell or body 70 is vertically bored to form a plastic chamber 73 and the lower end member 72 has internal bevels 75 and 76 which lead to an extrusion orifice 77 at the lower end thereof. All of the foregoing corresponds generally to the chamber and orifice formations of the sleeve 46 and end member 47 of the previously described embodiment.

In FIG. 10 a sleeve member 80 corresponds to the control sleeve 30 of the previous embodiment, a degating sleeve 81 corresponds to the degating sleeve 32 of the previous embodiment, and a blow tube 82 corresponds to the blow tube 34 of the previous embodiment. Some or all of the three sleeves or tubes are moved relatively in an axial direction in a predetermined cyclic pattern during extrusion operations, as in the previous embodiment. It will be noted that the lower ends of all three of the tubes or sleeves 80, 81 and 82 are beveled or chamfered and that in the illustrated instance the bevel at the lower end of control sleeve 80 is flatter or more horizontal than the bevels at the ends of degating sleeve 81 and blow tube 82. Furthermore, the junctures of the bevels of all three tubes or sleeves with their external peripheries are rounded, as clearly shown in FIG. 10.

Under certain conditions and to remedy certain defects which occur when the degating sleeve extends below the control sleeve, it is desirable to round the outer edge of the bevel of the degating sleeve. This is done primarily to avoid marring the internal surface of the extruding tube of plastic material. However, when this is done and the degating sleeve is withdrawn to the position illustrated in FIG. 2, it creates a reentrant angle which produces roughness at the interior surface of the parison or extruded plastic tube.

On the other hand, if the degating sleeve must project beyond the control sleeve during the entire extrusion cycle, it limits the degree of control which may be effected by the control sleeve, excepting when the bevels of these members or, more properly, the relationship of the bevel of the control sleeve to the internal bevel of the extrusion head, is modified generally in accordance with FIG. 10.

It will be noted that in FIG. 10 the bevel of the control sleeve 80 is much flatter than the adjacent internal bevel 76 of the extrusion head and that therefore the extrusion space between the control sleeve and the bevel 76 may be made as narrow as desired without withdrawing the degating sleeve 81 within or even flush with the lower end of control sleeve 80. Thus the objectionable reentrant angle referred to above is avoided while still giving the greatest possible range of control to the control sleeve. A similar result may be attained by reversing the slopes of the bevels 75 and 76 of the ledge portion of the extrusion chamber, in which case the maximum control may be attained without having different bevels at the ends of the sleeves.

A further problem which presents itself in the manufacture of bottles of certain sizes and proportions arises as a result of the limitations which arise from and depend upon the wall thicknes of the degating sleeve. One form in which this problem arises is in the production of bottles having relatively light or thin wall finishes but wherein it is desired that the body of the bottle have a relatively heavy wall.

In the first place, if a degating sleeve of the general thickness of degating sleeve 32 of FIGS. 2 through 6 is employed, then with thin walled finishes the wall thickness of the finish part of the extrusion may be less than the radial space between the wall of the orifice 26 and the external periphery of the blow tube. In such case the opening in the finish end of the parison will not adhere to the blow tube when the latter is depressed. This interferes with the development of a good false finish (or true finish where a false finish is not employed) and also interferes with the very valuable "orientation" function which is accomplished by suspending the finished bottle on the blow tube.

Merely making the degating sleeve progressively thinner is not alone an answer to the problem, since in that case the outer end of the degating sleeve is so narrow that it does not form an adequate extrusion surface and the internal surface of the parison will be rough or corrugated.

In FIG. 10 the degating sleeve 81 has a relatively thin wall but the extrusion control function normally performed by its sloping end surface is entirely, or in large part, transferred to the outer end of the blow tube 82 which is beveled in this modification and cooperates with the upper end of orifice 77 to form a further alternative extrusion orifice which may operate cyclically in alternation with the orifice formed by control sleeve 80 to provide an extrusion or blank of varying wall thickness along its length. This arrangement avoids the objections noted above which apply to certain cases and avoids the reentrancy noted above which is inimical to the forming of extrusions having a smooth interior wall.

I claim:

1. Appartus for forming blown hollow articles from plastic material, said apparatus comprising separable mold means defining a cavity, extrusion means for extruding a tube of plastic material to be formed in the space between the mold means, said extrusion means comprising an extrusion chamber having a reduced orifice, a sleeve in said chamber and having an external diameter less than the diameter of said chamber to provide an annular plastic extrusion passage, and a second sleeve telescoping within said control sleeve and adapted to cooperate with said extrusion orifice to define a further extrusion passage portion, one of said sleeves having an end portion of non-circular cross-section to define an extrusion passage portion of non-uniform width for extruding a tube portion of varying wall thickness about its circumference, at least one of said sleeves being cyclically movable toward and away from said orifice to cyclically vary the proportionate extrusion control effects of said sleeves, and a cyclically movable mandrel telescoping within said second sleeve, the inside diameter of said first sleeve and the outside diameter of said second sleeve being substantially equal to the diameter of said extrusion orifice whereby said second sleeve may be moved thereinto to sever an extruded tube from the parent body of plastic material.

2. Apparatus for forming blown hollow articles from plastic material, said apparatus comprising separable mold means defining a cavity, extrusion means for extruding a tube of plastic material to be formed in the space between the mold means, said extrusion means comprising an extrusion chamber having a reduced orifice, a plurality of telescoping sleeves in said chamber spaced inwardly of the chamber wall to provide an annular plastic passage, said sleeves having end portions cooperating with said orifice to define successive extrusion passage portions, at least one of said sleeves having an end portion of non-circular cross-section to define an extrusion passage portion of non-uniform width for extruding a tube portion of varying wall thickness about its circumference, said sleeves being independently cyclically movable toward and away from said orifice to render the sleeves selectively operable in varying proportionate degrees for producing dimensionally varying tubular extrusions in cooperation with said orifice, the inner of said telescoping sleeves having an external diameter substantially equal to the diameter of said reduced orifice for movement thereinto to sever an extruded tube.

3. Apparatus for forming blown hollow articles from plastic material, said apparatus comprising separable mold means defining a cavity, extrusion means for extruding a tube of plastic material to be formed in the space between the mold means, said extrusion means comprising an extrusion chamber having an annular end portion sloping toward and terminating in a reduced orifice, a plurality of telescoping sleeves in said chamber spaced inwardly of the chamber wall to provide an annular plastic passage, said sleeves having end portions cooperating with said extrusion chamber end portion to define plural extrusion passage portions, said sleeves having sloping ends generally complementary to said chamber end portion, at least one of said sleeves having an end portion of non-circular cross-section to define an extrusion passage portion of non-uniform width for extruding a tube portion of varying wall thickness about its circumference, said sleeves being independently cyclically movable toward and away from said chamber end portion to render the sleeves successively operable in varying proportionate degrees for producing dimensionally varying tubular extrusions in cooperation with said extrusion chamber end portion, the inner of said telescoping sleeves having an external diameter substantially equal to the diameter of said reduced orifice for movement thereinto to sever an extruded tube.

4. Apparatus for cyclically forming blown hollow articles from plastic material, said apparatus comprising separable mold means defining a cavity, extrusion means for cyclically extruding a tube of plastic material to be formed in the space between the mold means, said extrusion means comprising an extrusion chamber having an end portion sloping toward and terminating in a reduced orifice, a first movable sleeve in said chamber and having an external diameter less than the diameter of said chamber and an internal diameter approximately equal to the diameter of said orifice, said sleeve having a sloping end face generally complementary to said extrusion chamber end portion to provide an annular plastic passage, and a second movable sleeve telescoping within said first sleeve and adapted to cooperate with said extrusion chamber end portion to define a further extrusion passage portion, said second movable sleeve likewise having a sloping end face, at least one of said sleeves being cyclically movable toward and away from said chamber end portion to define variable annular extrusion means, and a cyclically movable mandrel telescoping within said second sleeve, said second movable sleeve fitting peripherally within said reduced orifice whereby movement of said sleeve into said orifice severs an extruded tube from the supply body of plastic material.

5. Apparatus for cyclically forming blown hollow articles from plastic material, said apparatus comprising separable mold means defining a cavity, extrusion means for cyclically extruding a tube of plastic material to be formed in the space between the mold means, said extrusion means comprising an extrusion chamber having an end portion sloping toward and terminating in a reduced orifice, a first movable sleeve in said chamber and having an external diameter less than the diameter of said chamber and an internal diameter approximately equal to the diameter of said orifice, and a second movable sleeve telescoping within said first sleeve and adapted to cooperate with said extrusion chamber end portion to define a further extrusion passage portion, said sleeves having sloping end faces with the slope of the end face of said first movable sleeve generally complementary to said extrusion chamber end portion to provide an annular plastic passage, at least one of said sleeves being cyclically movable toward and away from said chamber end portion to define variable annular extrusion means, and a cyclically movable mandrel telescoping within said second sleeve, said second movable sleeve fitting peripherally within said reduced orifice whereby movement of said sleeve into said orifice severs an extruded tube from the supply body of plastic material.

6. Apparatus for cyclically forming blown hollow articles from plastic material, said apparatus comprising separable mold means defining a cavity, extrusion means for cyclically extruding a tube of plastic material to be formed in the space between the mold means, said extrusion means comprising an extrusion chamber having an end portion sloping toward and terminating in a reduced orifice, a first movable sleeve in said chamber and having an external diameter less than the diameter of said chamber and an internal diameter approximately equal to the diameter of said orifice, and a second movable sleeve telescoping within said first sleeve and adapted to cooperate with said extension chamber end portion to define a further extrusion passage portion, said sleeves having sloping end faces with the slope of the end face of said first movable sleeve generally complementary to said extrusion chamber end portion to provide an annular plastic passage, said sleeves being independently cyclically movable toward and away from said chamber end portion to define variable annular extrusion means, said second movable sleeve fitting peripherally within said reduced orifice whereby movement of said sleeve into said orifice severs an extruded tube from the supply body of plastic material.

7. Apparatus for forming blown hollow articles from plastic material, said apparatus comprising separable mold means defining a cavity, extrusion means for extruding a tube of plastic material to be formed in the space between the mold means, said extrusion means comprising an extrusion chamber having a reduced orifice, a sleeve in said chamber and having an external diameter less than the diameter of said chamber to provide an annular plastic extrusion passage, and a second sleeve telescoping within said control sleeve and adapted to cooperate with said extrusion orifice to define a further extrusion passage portion, said first sleeve having an end portion of non-circular cross-section to define an extrusion passage portion of non-uniform width for extruding a tube portion of varying wall thickness about its circumference, at least one of said sleeves being cyclically movable toward and away from said orifice to cyclically vary the proportionate extrusion control effects of said sleeves, and a cyclically movable mandrel telescoping within said second sleeve, the inside diameter of said first sleeve and the outside diameter of said second sleeve being substantially equal to the diameter of said extrusion orifice whereby said second sleeve may be moved thereinto to sever an extruded tube from the parent body of plastic material.

8. A method of forming blown hollow articles from a supply body of plastic material, said method comprising forcing the material through an annular orifice to extrude a tube of plastic material downwardly to be formed in a space between separable mold means which form when in closed position a cavity open at its top end, the open end of said cavity being coaxial with said orifice and adjacent thereto, then projecting a mandrel downwardly through the extrusion orifice into contact with the interior of said extruded tube of plastic material and into said open end of said cavity, continuing extrusion during downward movement of said mandrel with the extrusion adhering to the periphery thereof, closing the mold means on said extruded tube to clamp the same between the cavity surfaces and said mandrel at the open end of said cavity, blowing air into said extruded tube to expand the same into conformity with said mold cavity, opening the mold with the mandrel disposed in the end of said blown article whereby the article remains suspended by frictional engagement of the mandrel in the end of the article, and disengaging the article by relative axial movement between the mandrel and the article.

9. A method of forming blown hollow articles from a supply body of plastic material, said method comprising forcing the material through an annular orifice to extrude a tube of plastic material downwardly to be formed in a space between separable mold means which form when in closed position a cavity open at its top end, the open end of said cavity being coaxial with said orifice and adjacent thereto, then projecting a blow tube downwardly through the extrusion orifice and into contact with the interior of the portion of said extruded tube of plastic material which is disposed in the open end of said cavity, closing the mold means on said extruded tube thereby clamping the same between the blow tube and the mold cavity surface at the open end of said cavity, blowing air through said blow tube to expand the extruded tube into conformity with said mold cavity, opening the mold with the blow tube disposed in the end of said blown article whereby the article remains suspended by frictional engagement of the blow tube in the end of the article, and disengaging the article by relative axial movement between the blow tube and the article.

10. Apparatus for forming blown hollow articles from plastic material, said apparatus comprising separable mold means defining a cavity, extrusion means for extruding a tube of plastic material to be formed in the space between the mold means, said extrusion means comprising an extrusion chamber having a fixed orifice comprising a converging tapering surface of revolution, a plurality of telescoping sleeves in said chamber spaced inwardly of the chamber wall to provide an annular plastic passage, said sleeves having tapering end portions cooperating with said tapering orifice surface to define successive extrusion passage portions, at least one of said sleeves having an end portion of non-circular cross-section to define an extrusion passage portion of non-uniform width for extruding a tube portion of varying wall thickness about its circumference, said sleeves being independently cyclically movable toward and away from said orifice to render the sleeves selectively operable in varying proportionate degrees for producing dimensionally varying tubular extrusions in cooperation with said orifice.

11. Apparatus for forming blown hollow articles from plastic material, said apparatus comprising separable mold means defining a cavity, extrusion means for extruding a tube of plastic material to be formed in the space between the mold means, said extrusion means comprising an extrusion chamber having an annular end portion sloping toward and terminating in a fixed reduced orifice, a plurality of telescoping sleeves in said chamber spaced inwardly of the chamber wall to provide an annular plastic passage, said sleeves having end portions cooperating with said extrusion chamber end portion to define plural extrusion passage portions, said sleeves having sloping ends generally complementary to said chamber end portion, at least one of said sleeves having an end portion of non-circular cross-section to define an extrusion passage portion of non-uniform width for extruding a tube portion of varying wall thickness about its circumference, said sleeves being independently cyclically movable toward and away from said chamber end portion to render the sleeves successively operable in varying proportionate degrees for producing dimensionally varying tubular extrusions in cooperation with said extrusion chamber end portion.

References Cited in the file of this patent

UNITED STATES PATENTS

| | | |
|---|---|---|
| 1,504,653 | Taylor | Aug. 12, 1924 |
| 2,288,454 | Hobson | June 30, 1942 |
| 2,632,202 | Haines | Mar. 24, 1953 |
| 2,706,308 | Lorenz | Apr. 19, 1955 |
| 2,750,625 | Colombo | June 19, 1956 |
| 2,780,835 | Sherman | Feb. 12, 1957 |
| 2,861,295 | Hagen et al. | Nov. 25, 1958 |
| 2,878,520 | Mumford et al. | Mar. 24, 1959 |
| 2,903,740 | Parfrey | Sept. 15, 1959 |

FOREIGN PATENTS

| | | |
|---|---|---|
| 1,030,004 | France | Mar. 11, 1953 |